United States Patent
Schneider

(10) Patent No.: US 6,860,686 B2
(45) Date of Patent: Mar. 1, 2005

(54) ARRANGEMENT FOR ATTACHING AN ASSEMBLY COMPONENT WITH VARIABLE SPACING TO AN UNDERSTRUCTURE

(75) Inventor: Wilhelm Schneider, Rednitzhembach (DE)

(73) Assignee: Richard Bergner Verbindungstechnik GmbH & Co. KG, Schwabach (DE)

(*) Notice: Subject to any disclaimer, the term of this patent is extended or adjusted under 35 U.S.C. 154(b) by 0 days.

(21) Appl. No.: 10/462,784

(22) Filed: Jun. 17, 2003

(65) Prior Publication Data

US 2003/0205014 A1 Nov. 6, 2003

Related U.S. Application Data

(63) Continuation of application No. 10/349,319, filed on Jan. 23, 2003, now abandoned.

(30) Foreign Application Priority Data

Jan. 23, 2002 (DE) .......................................... 102 02 663

(51) Int. Cl.$^7$ ............................................... F16B 13/04
(52) U.S. Cl. ......................... 411/34; 411/107; 411/546; 403/297
(58) Field of Search ............................. 411/34–38, 71, 411/72, 107, 546; 403/279, 280, 282, 291, 297, 408.1

(56) References Cited

U.S. PATENT DOCUMENTS

| | | | | |
|---|---|---|---|---|
| 2,277,885 A | * | 3/1942 | Rodanet | |
| 2,456,480 A | * | 12/1948 | Austin | |
| 2,904,379 A | * | 9/1959 | Nelson | |
| 4,525,915 A | * | 7/1985 | Rich | |
| 4,732,519 A | * | 3/1988 | Wagner | |
| 5,184,698 A | * | 2/1993 | Cofenberry | |
| 5,664,919 A | * | 9/1997 | Smith | |
| 5,683,215 A | * | 11/1997 | Gaignard | |
| 5,709,513 A | * | 1/1998 | Tsai | |

FOREIGN PATENT DOCUMENTS

| | | |
|---|---|---|
| DE | 42 24 575 C2 | 3/1993 |
| DE | 201 19 112 U1 | 4/2002 |
| DE | 202 04 994 U1 | 8/2002 |

* cited by examiner

*Primary Examiner*—Flemming Saether
(74) *Attorney, Agent, or Firm*—Venable LLP; Catherine M. Voorhees

(57) ABSTRACT

An arrangement for attaching an assembly component with variable spacing to an understructure with the aid of a fastening element is provided. The fastening element comprises a fixing bolt, a spacer element with a cylindrical outside surface and an elastomeric sleeve. The fixing bolt is embraced by the cylindrical outside surface of the spacer element and is provided on one end with a radially overhanging head with a larger outside diameter than the spacer element and on the other end with a fixing section that interacts with a counter element. The elastomeric sleeve encloses the spacer element, is positioned inside a bore of the assembly component and is longer than the spacer element, wherein the elastomeric sleeve can be displaced axially relative to the bore in the assembly component as well as relative to the spacer element.

21 Claims, 17 Drawing Sheets

US 6,860,686 B2

ARRANGEMENT FOR ATTACHING AN ASSEMBLY COMPONENT WITH VARIABLE SPACING TO AN UNDERSTRUCTURE

CROSS-REFERENCE TO RELATED APPLICATION

This is a continuation of U.S. patent application Ser. No. 10/349,319 filed on Jan. 23, 2003 now abandon, which claims the priority of German Patent Application No. 102 02 663.7 filed Jan. 23, 2002, the disclosures of which are incorporated herein by reference.

BACKGROUND OF THE INVENTION

The invention relates to an arrangement, used to attach an assembly component with variable spacing to an understructure with the aid of a fastening element. In the field of automotive engineering or facade construction, for example, two components must frequently be secured to each other in such a way that a defined distance is maintained between the two parts. One easy option for joining the components is the insertion of spacer elements, for example washers. The problem with this method is that respectively dimensioned spacer elements must be made available for every conceivable distance, which is hardly possible, particularly in the case of production or assembly tolerances. Solutions for this problem can be found in references DE 202 04 994 U1, DE 201 19 112 U1 and DE 42 24 575 C2. The arrangements and devices described therein, however, are relatively involved and therefore expensive. In addition, they cannot be used to create a sealed connection.

SUMMARY OF THE INVENTION

Thus, it is an object of the invention to propose an arrangement of the aforementioned type, which uses a structurally simple design for ensuring a sealed connection between two components at variable distances to each other.

According to an exemplary embodiment, two components are secured to each other and/or an assembly component is secured to an understructure with the aid of a fastening element, comprising a fixing bolt, a spacer element with a cylindrical outside surface and an elastomeric sleeve. The fixing bolt is enclosed by the cylindrical outside surface of the spacer element and is provided on one end with a radially overhanging head having an outside diameter larger than the spacer element and on the other end with a fixing section. The elastomeric sleeve encloses the spacer element, is positioned axially displaceable inside a bore of the assembly component and is longer than the spacer element. The elastomeric sleeve can be displaced in an axial direction relative to the bore in the assembly component, as well as relative to the spacer element. In addition, the respective length of the elastomeric sleeve and the spacer element exceeds the length of the material region of the assembly component that surrounds the bore. Finally, the fixing bolt is dimensioned such that its fixing section projects from the elastomeric sleeve and can transfer a pre-stressing force in the connection.

Whereas known solutions require the use of connecting elements that are highly involved with a corresponding costly design, the fastening element described herein is comprised of easy to produce parts and additionally ensures a sealed connection. Another and critical advantage is that the proposed fastening element automatically adapts to the respective distance between the two components, without requiring elements with a technically involved design.

BRIEF DESCRIPTION OF THE DRAWINGS

The foregoing and other features and advantages of the invention will be apparent from the following description of preferred embodiments of the invention, as illustrated in the accompanying drawings where like reference numbers generally indicate identical, functionally similar, and/or structurally similar elements and wherein.

DETAILED DESCRIPTION OF THE INVENTION

Figure 1A:
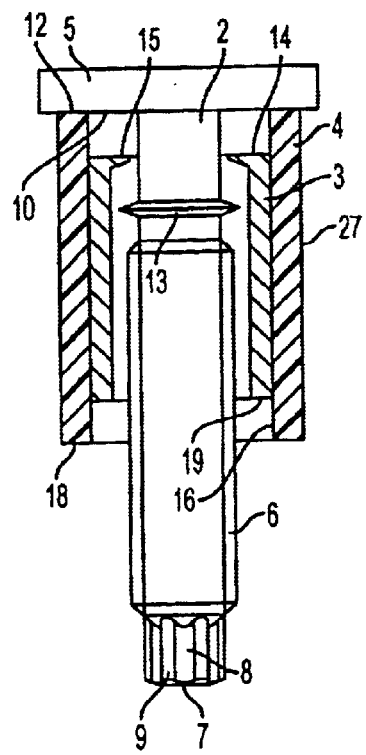
FIGS. 1A–E and 2 illustrate different designs for fastening elements according to the invention.

FIGS. 1A–E and 2 show differently designed fastening elements 1. The fastening elements comprise a fixing bolt 2, a spacer element preferably including metal and taking the form of a spacer sleeve 3 through which the fixing bolt 2 projects, and an elastomeric sleeve 4 surrounding the spacer sleeve 3. One end of the fixing bolt 2 is provided with a radially overhanging head 5 while the other end is provided with a threaded section 6. This threaded section ends axially at a distance before a front end 7 of fixing bolt 2, which is located at a distance from the head. The longitudinal section 8 between the threaded section 6 and the front end 7 has a smaller diameter than the threaded section 6 and is provided with axially extending, radially projecting ribs 9 along the circumference. A tool can be attached to the longitudinal section 8 to secure the fixing bolt 2 in a position secured against rotation, as will be explained later on. The longitudinal section 8 simultaneously functions as search tip. The head 5 has a circular cross-sectional shape and extends far enough in a radial direction, so that the head support surface 10, formed by the underside of the head 5, completely covers an end 12 of the elastomeric sleeve on the side near the head.

The spacer sleeve 3 may be held in a non-loosening or form-fitting manner by the fixing bolt 2. For this, the fixing bolt is provided with a radial ring-shaped projection 13 on the longitudinal section between the threaded section 6 and the head 5. This ring-shaped projection cooperates with projections 15, which are distributed across the circumference of the spacer sleeve 3 on an end 14 of the spacer sleeve 3 near the head 5, such that a form-fitting connection is created that is effective in radial direction. The ring-shaped projection 13 is arranged at an axial distance to the head, wherein the projections 15 project into the fixing-bolt region between the ring-shaped projection 13 and the head 5 and extend over the ring-shaped projection 13. The spacer sleeve 3 thus can occupy two different extreme positions relative to the fixing bolt 2. In the one extreme position P1, the end 14 of spacer sleeve 3 rests against the head support surface 10 and in the other extreme position P2, the projections 15 rest against the ring-shaped projection 13 (see FIG. 8).

The inside surface 16 of the elastomeric sleeve 4 rests against the outside surface 17 of the spacer sleeve 3, at least at the central sleeve region. The spacer sleeve 3 can be moved in an axial direction relative to the elastomeric sleeve 4. The axial mobility also can be enhanced with a sliding coating on the surface of the elastomeric sleeve 4. The length L1 of the elastomeric sleeve 4 is longer than the length L2 of the spacer sleeve 3. The lengths L1 and L2 are dimensioned such that the difference (L1–L2) corresponds to the maximum displacement distance V for the spacer sleeve 3 (see FIG. 8). This type of design ensures that the portion of the elastomeric sleeve that overhangs at the end 14 near the head and/or a front end 18 at a distance from the head can be selected freely. In that case, the spacer sleeve 3 and the elastomeric sleeve 4 can be displaced far enough in an axial direction against each other, so that the front end 18 of the elastomeric sleeve 4 and a front end 19 of the spacer sleeve, both front ends 18, 19 at a distance from the head, may be positioned in one plane (see FIG. 1D for example).

Figure 3:
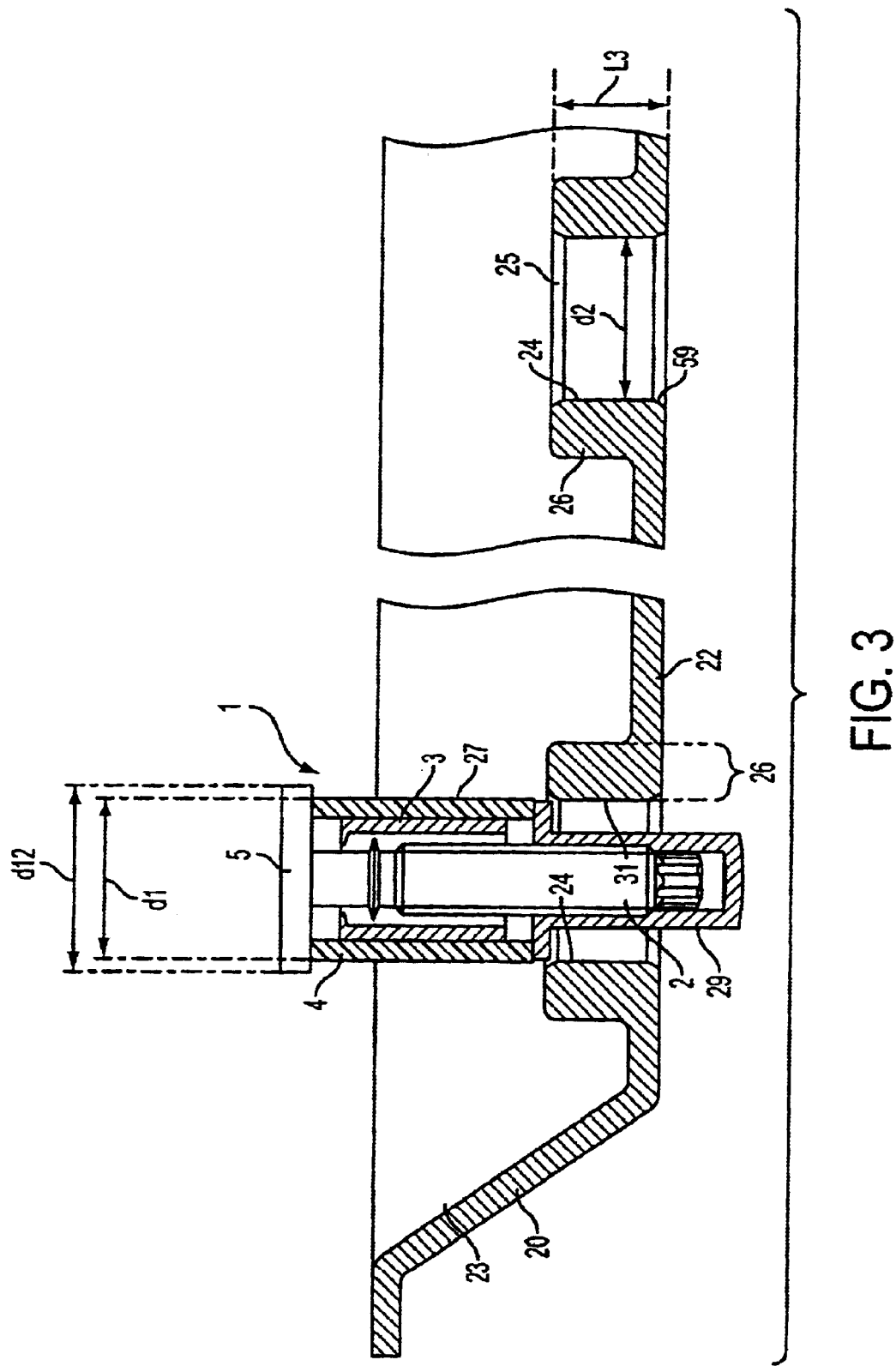
FIGS. 3 to 8 are sectional views showing the attachment of a shell-shaped assembly component to an understructure, according to the invention.

The function of an arrangement for joining parts must be explained first before additional structural details are discussed. FIG. 3 shows an assembly component 20, a rear spoiler for a motor vehicle, which is a shell-shaped part with a bottom plate 22 and side walls 23. The bottom plate contains several bores 24 for accommodating a fastening element 1. As shown in FIG. 3, a fastening element is inserted from the top into a bore 24. The bore 24 is provided with an insertion bevel 25 at its upper end to facilitate the insertion. The material region 26 of the assembly component 20, which encloses the bore 24, has a length L3 that is shorter than the length L2 of the spacer sleeve 3. The inside wall 31 of the bore 24 forms a cylindrical shell surface. The same is true for the outside surface 27 of the elastomeric sleeve 4.

The diameter d2 of the bore 24 is the same size or slightly larger than the outside diameter d1 of the elastomeric sleeve 4, so that the sleeve can be displaced axially inside the bore, nearly without frictional engagement between the sleeve and the inside wall 31 of the bore 24. However, it is also conceivable that the outside diameter d1 of the elastomeric sleeve 4 is slightly larger than the inside diameter d2 of the bore 24. The difference between the aforementioned diameters (d1–d2) in this case is selected such that the elastomeric sleeve 4 is slightly compressed in the radial direction and is thus positioned frictionally engaged inside the bore, but can still be displaced in the axial direction.

Figure 4:
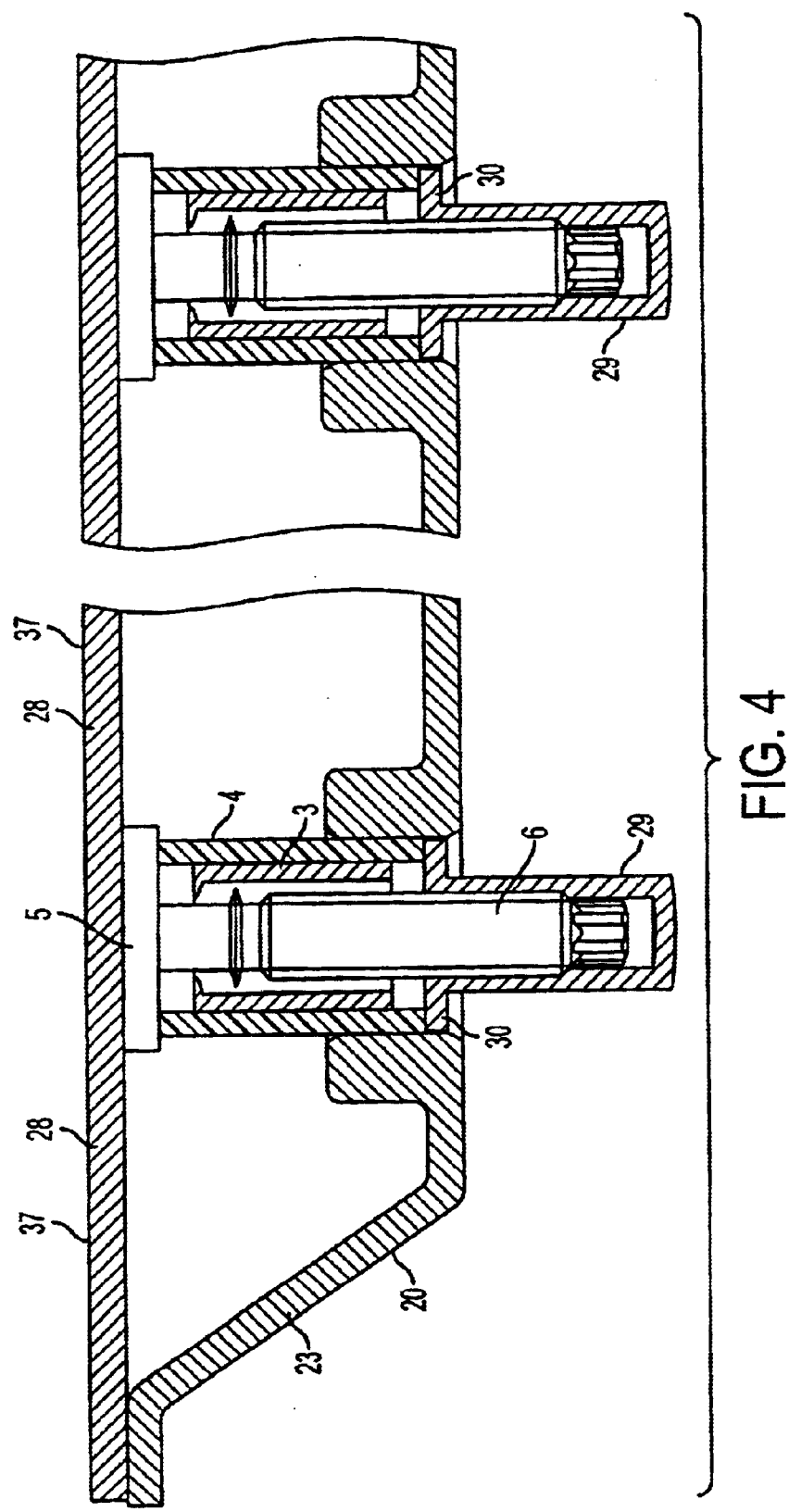

In each case, fastening elements are inserted into all the bores, as indicated in FIG. 4. For the special case at hand, the fastening elements 1 should not be visible later on in the fully assembled state. For that reason, the assembly component is closed off with a cover 28.

A protective cap 29 is respectively fitted onto the threaded sections 6 that project from the assembly component 20. This cap has a sleeve-type design that is closed off on one end and has a radially outward projecting flange 30 at the open end. The diameter d3 of this flange is dimensioned such that it extends at least in part into the front end 18 of the elastomeric sleeve 4, located at a distance from the head. The protective cap 29 is made from an elastic material and its inside diameter d4 is slightly smaller when not fitted on than the outside diameter d5 of the threaded section 6 of fixing bolt 2. Elastic restoring forces thus hold the protective cap 29 on the fixing bolt 2 and prevent the elastomeric sleeve 4 from detaching itself. For the case at hand, the protective cap 29 protects the threaded section 6 and those sections of the elastomeric sleeve 4 and the spacer sleeve 3 that are accessible via the bore 24 against being coated with enamel while the assembly component 20 is enameled. Of course, if such an enameling step is not required, the protective caps can be omitted or can be used simply to hold the elastomeric sleeve 4 on the fixing bolt 2 or to protect the threaded section against damage.

Figure 5:
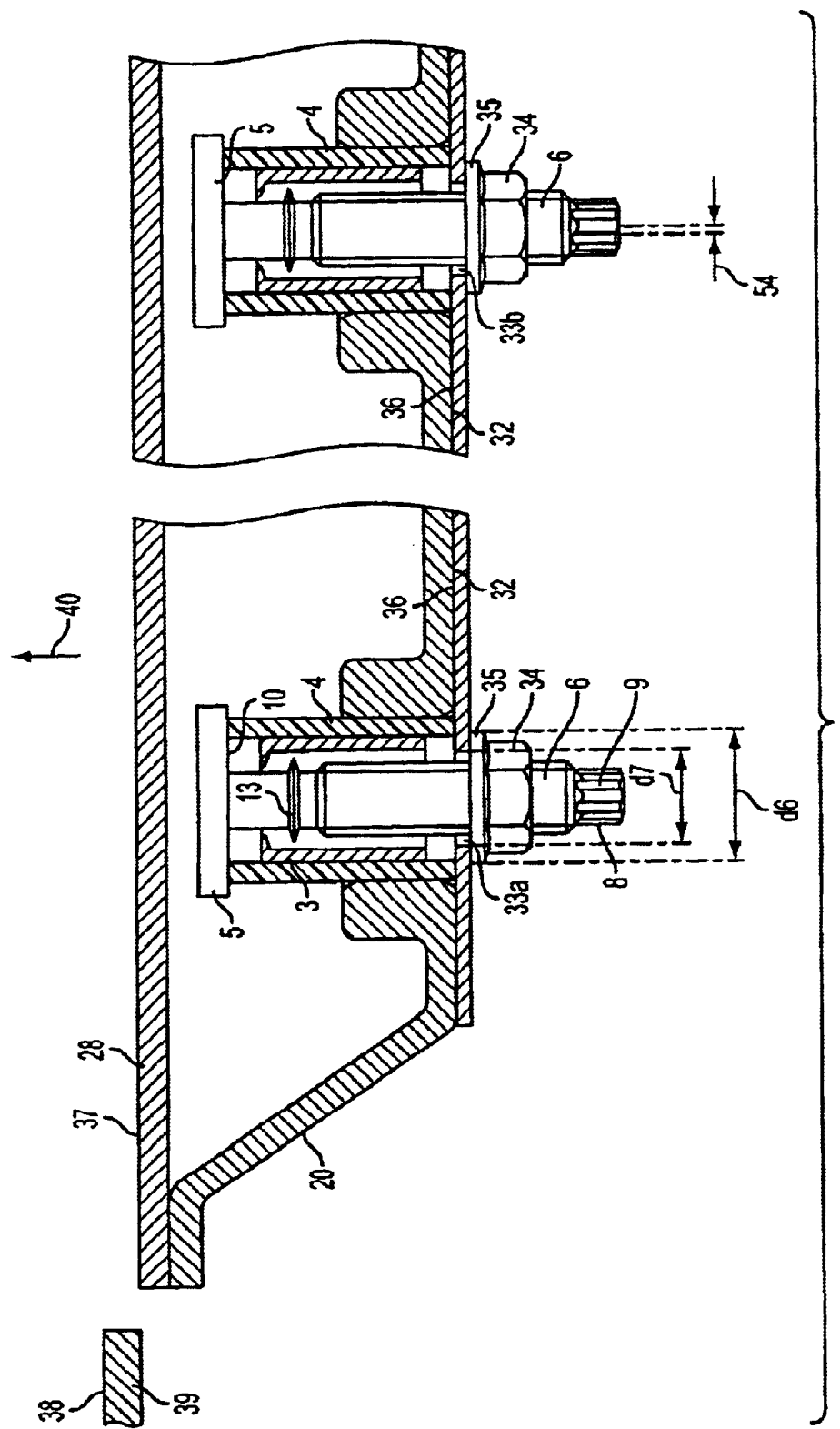

The assembly component 20 provided with the fastening elements 1 is then fitted onto an understructure 32. The understructure 32 contains bores 33a, 33b into which the threaded section 6 is inserted. In the pre-assembly state according to FIG. 5, the assembly component 20 rests on the understructure 32. A nut 34 is screwed as a counter element onto the threaded section 6. The side of the nut facing the head 5 of the fixing bolt 2 is provided with a flange 35, having a diameter d6 that is larger than the inside diameter d7 of the bore 33a, 33b. The nut 34 is screwed far enough onto the threaded section 6, so that the elastomeric sleeve 4 is pushed by the head 5 with little force, meaning without noticeable axial deformation, against an inside surface 36 of understructure 32 that faces the head 5.

Figure 6:
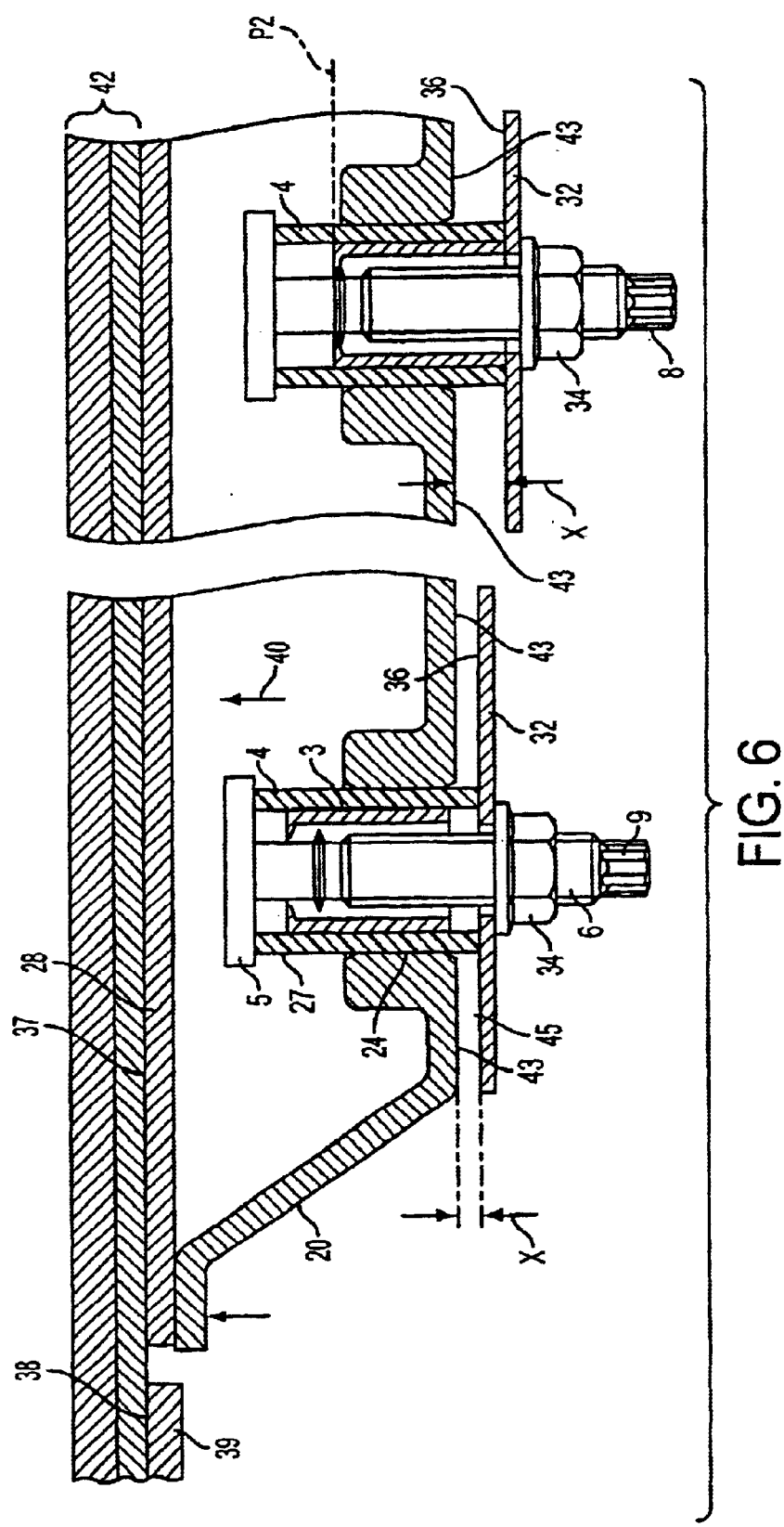

For the exemplary embodiment described, the assembly component 20 is to be aligned in such a way that the surface 37 of its cover 28 is aligned with the surface 38 of another component 39, for example the roof of a vehicle. For this, the assembly component 20 is removed from the understructure 32 in the direction of arrow 40 and is secured in the desired position (see FIG. 6) with the aid of an auxiliary structure 42. A distance X is thus maintained between an inside surface 43 of the assembly component 20, located at a distance from the head 5, and the inside surface 36 of the understructure 32 where the inside surfaces 36, 43 face one another. In the fully assembled state, the fastening elements 1 are designed to preserve this distance. During the removal of the assembly component 20 from the understructure 32, the nuts 34, which pre-secure the fastening elements 1 on the understructure 32 may be loosened, or the fastening elements may be pre-secured in a loose fashion. As result, the inside walls 31 of the bores 24 in the assembly component 20 may glide in the axial direction and/or in the direction of arrow 40 along the outside surface 27 of the elastomeric sleeve 4. The distance X, for example, can vary based on production or assembly tolerances or for other reasons. The right side of FIG. 6 shows a situation involving a larger distance X'. For the exemplary embodiment shown, this distance results from the understructure 32 being farther removed from the component 39 than is the case for the illustration shown on the left side of FIG. 6.

The final assembled state is reached by tightening the nuts 34. In the process, the head 5 respectively moves downward and/or in the direction of arrow 44 and compresses the elastomeric sleeve 4 in axial direction. During the further course of this action, the head 5 hits the spacer sleeve 3 and may displaces it in the direction of arrow 44. During this process, the elastomeric sleeve 4 is shortened until the spacer sleeve 3 rests with its front end 19 on the inside surface 36 of the understructure 32. The nut 34 is then tightened further until the desired pre-tensioning force for the fixing bolt 2 is reached. Thus, in the final assembled state, the spacer sleeve 3 is clamped between the head 5 and the understructure. This represents a so-called hard tightening case, which ensures a secure screw connection.

The distance X and/or X' is fixed by radially expanding the elastomeric sleeve in the region of the gap 45 that defines the distance X during the axial compression of the elastomeric sleeve 4 and by pushing elastomeric material into the gap 45. A corresponding radial expansion of the elastomeric sleeve 4 also occurs with the section of the elastomeric sleeve 4 that is projecting from the material region 26 and/or its top surface 46 that is facing the head 5. In the final assembled state, the material region 26 and/or the assembly component 20 is therefore clamped between two radially projecting material bulges 47, 48. These bulges on the one hand undercut the top surface 46 and, on the other hand, undercut the inside surface 43 of the assembly component 20. As a result, the assembly component 20 is secured tightly with vibration damping with a screw connection, but nevertheless with sufficient pre-tensioning force. A pre-tensioning force of this type could not be achieved if the nut 34 would support itself directly or indirectly on the front end 18 of the elastomeric sleeve 4, which is at a distance to the head.

Figure 7:
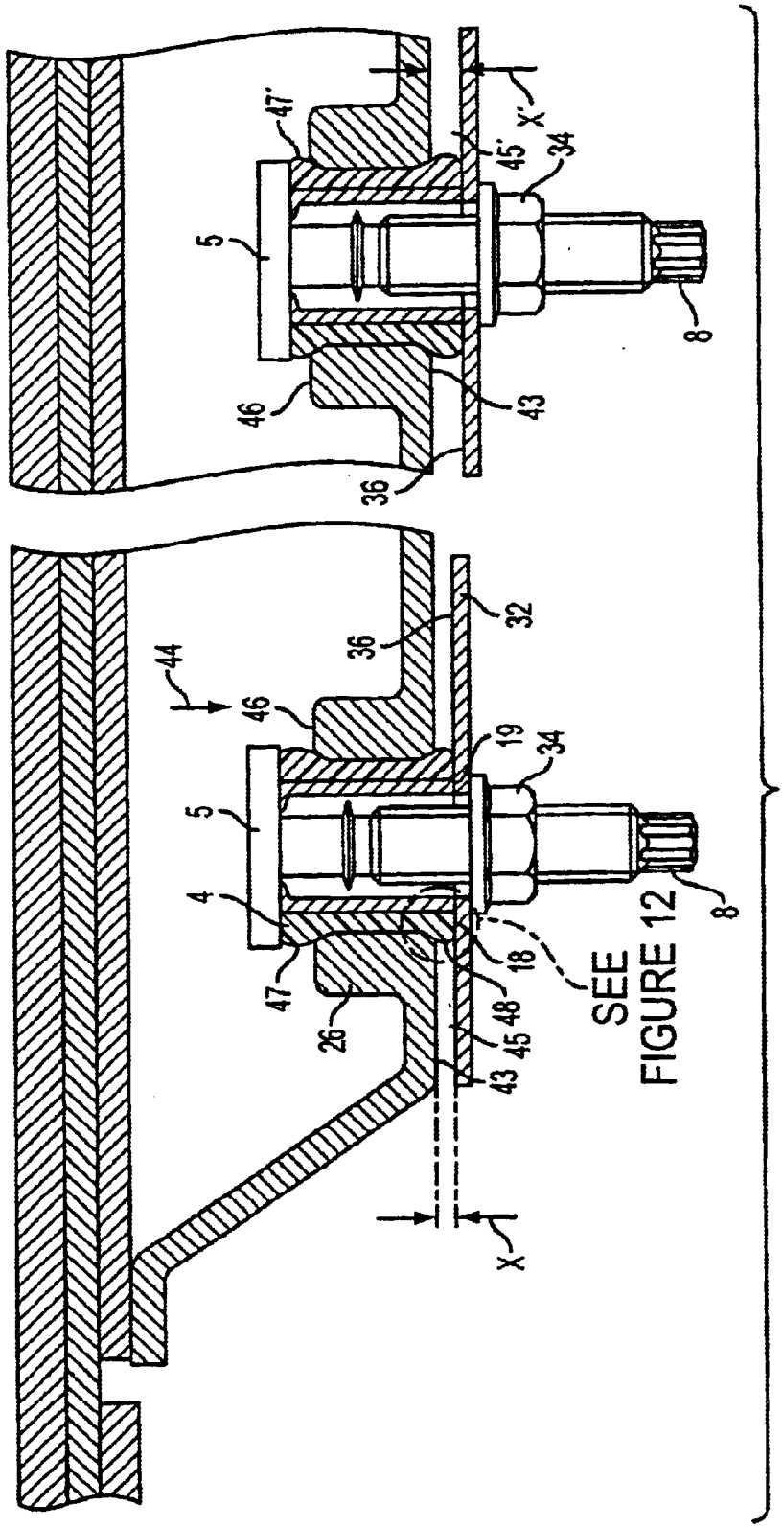

Owing to the variability of the distance X, it must be ensured that sufficient elastomeric material is always available for forming an upper and a lower material bulge 47 and 48. The material bulges 47, 48 can have different dimensions in the radial and axial directions (see left and right side of FIG. 7), depending on the distance X. As a result of the longer distance X', more elastomeric material is pushed into the gap 45', thus creating a shortage of material for forming the upper material bulge 47'. The upper bulge is accordingly smaller, but still meets its intended function of axially securing the assembly component 20 and sealing the joining location.

Figure 8:
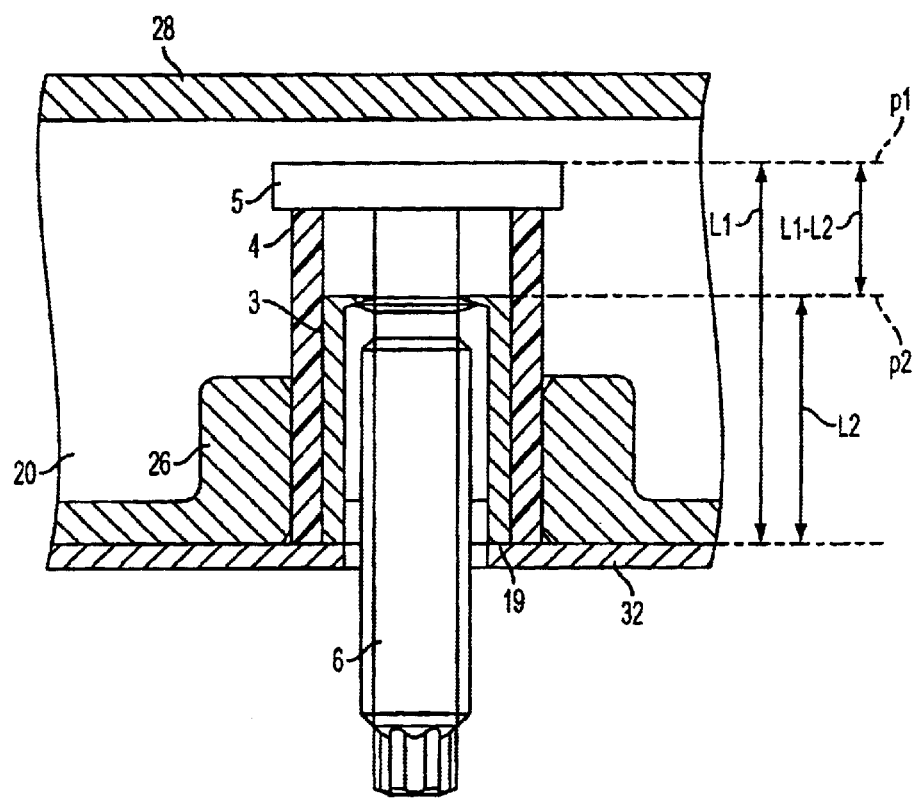

The axial compression required for the respective use and/or the amount of elastomeric material displaced during the tightening in radial direction results from the difference in length (L1–L2) between elastomeric sleeve 4 and spacer sleeve 3 (see also FIG. 8). This length difference is configured such that the maximum possible distance tolerance for the respective use can still be overcome. That is to say, if the elastomeric sleeve 4 is shorted axially by the amount of L1–L2, enough elastomeric material is always available for displacement in radial direction with sufficient axial bearing capacity, such that the material bulges 47, 48 can be formed.

If an axially effective undercut holds the fixing bolt 2 inside the spacer sleeve 3, it may be useful if the ring-shaped projection 13 is arranged on the fixing bolt 2 in an axial position that ensures that the displacement distance V corresponds approximately to the length difference L1–L2. The spacer sleeve 3 in that case can be moved to its extreme position P2 while in the pre-assembly state, meaning before the nut 34 is tightened so that the head 5 moves in the direction of arrow 44. In this extreme position, spacer sleeve 3 rests with its front end 19 on the understructure 32 (FIG. 6, right half, and FIG. 8). A relative position of this type can also function to prevent elastomeric material from entering the area between the front end 19 of spacer sleeve 3 and the understructure 32 if the elastomeric sleeve 4 is compressed and/or shortened axially, starting with the pre-assembled state shown on the right side of FIG. 6. Under some circumstances, the elastomeric material that has entered the area between the spacer sleeve 3 and the understructure 32 and/or another counter element to be tightened against the spacer sleeve 3 could make it more difficult to create the above-mentioned hard tightening case or could lead to other interruptions.

An undesirable material displacement of this type toward the inside could also present a problem at the end of the elastomeric sleeve 4 that is facing the head, in particular if the spacer sleeve 3 assumes the axial position P2 shown in FIG. 6 on the right and in FIG. 8. To counteract this danger, the fastening element 1 shown in FIG. 1D has an axially projecting collar 49, formed onto the head support surface 10. The outside diameter d8 of this collar is smaller than the inside diameter d9 of the elastomeric sleeve 4, thereby creating a radial play between the aforementioned parts. During the compression of the elastomeric sleeve 4 in the axial direction, the collar 49 prevents a radial deflection toward the inside of the elastomeric sleeve 4 end near the head.

Figure 2:
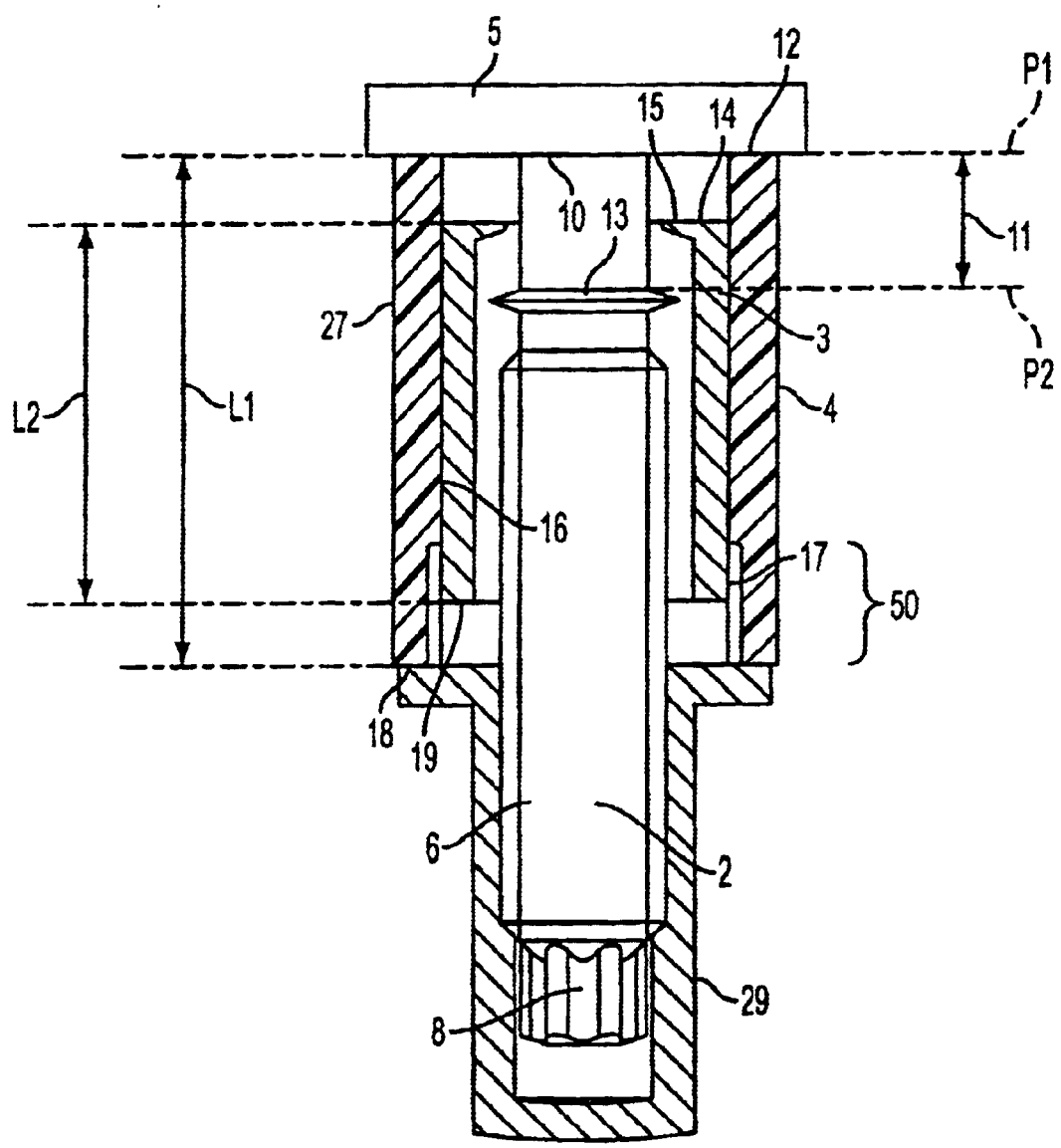

It is useful if an end region of the elastomeric sleeve 4 that projects from the bore 24 of the assembly component 20 has a higher malleability than the remaining sleeve region to control a radial expansion of the elastomeric sleeve 4 in the end regions and/or to control a time and/or locally separate deformation across the sleeve length. A higher malleability can be achieved, for example, by reducing the wall thickness of the elastomeric sleeve 4, as shown in FIG. 2. In this case, the wall thickness of the end region 50 of the elastomeric sleeve 4, which is at a distance from the head, is reduced from an inside wall of the elastomeric sleeve.

As a result of this embodiment, a relatively large deformation forms in the end region 50 at the start of the tightening operation, in the axial as well as the radial direction, wherein at least a partial bulge is formed. The sleeve region near the head and/or the remaining sleeve region, on the other hand, initially experiences less deformation particularly in the radial direction because of its lower malleability. This ensures that elastomeric material is pushed in the direction of the end region 50 and/or into the gap 45, where it is available for forming a material bulge with axial bearing capacity. To be sure, the wall strength can also be reduced at the outside sleeve. This has the disadvantage of requiring a larger radial deformation in the end region 50 in order to form a material bulge 48 with a correspondingly large undercut to the material region 26. A reduced malleability also can be achieved with locally defined areas of weakness, for example grooves extending in the axial direction or in the circumferential direction on the outside or inside of the elastomeric sleeve.

With the above-described example for an assembly, the head 5 is no longer accessible once the cover 28 is attached to the assembly component 20. A tool that is placed against the longitudinal section 8 is therefore used for holding the fixing bolt 2 in place while the nut 34 is tightened. The above-mentioned axially extending ribs 9 are provided so that a tool can be attached to the longitudinal section 8 to secure it against relative rotation.

In cases where no access is possible from the head side, the fastening element can be inserted into a bore 24 in such a way that it is inserted headfirst from the accessible side into the bore. To make this possible, the head 5 cannot project in a radial direction over the elastomeric sleeve 4, as shown in FIG. 1D.

It makes sense to secure the spacer sleeve 3 inside the elastomeric sleeve 4, for example by securing it form-fittingly inside the elastomeric sleeve 4. However, a frictional engagement can also be used to ensure that it cannot detach itself. According to FIGS. 1A and 1B, the fastening element is secured form-fittingly as follows. The spacer sleeve 3 in this case is positioned form-fittingly and effective in the axial direction inside the elastomeric sleeve, such that it can be detached again if an axial force is administered. For this, the sleeve is provided on the outside surface 17 with several neps 52, which engage form-fittingly in a complementary designed recess 53 on the inside wall of the elastomeric sleeve 4. The form-fitting connection may be broken repeatedly if the head acts upon the spacer sleeve in the direction of arrow 44 during the final assembly. The breakage of the form-fitting connection requires little force because of the elasticity of the elastomeric sleeve 4. It is advantageous for the assembly if the elastomeric sleeve 4 also can slide freely along the spacer sleeve 3. This is made possible without problem, for example, with the solutions according to FIGS. 1C, 1D and 1E.

Figure 1B:
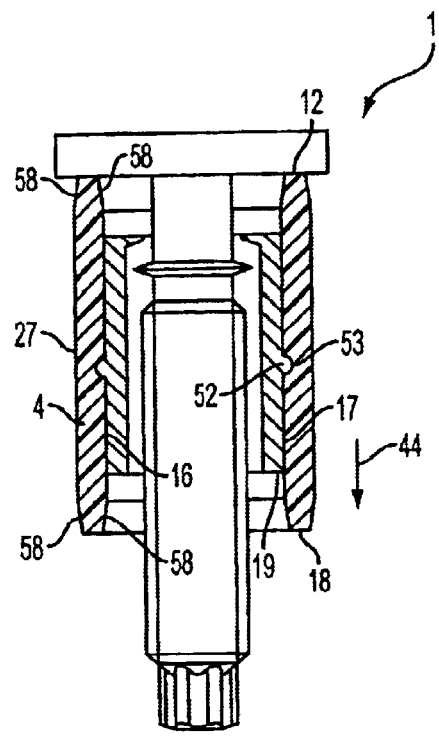
Figure 1C:
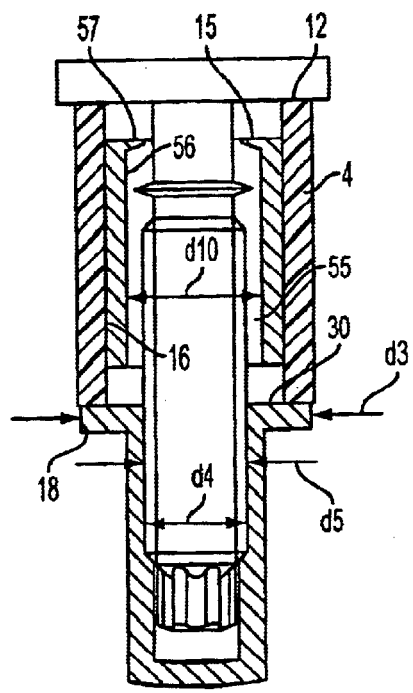
Figure 1D:
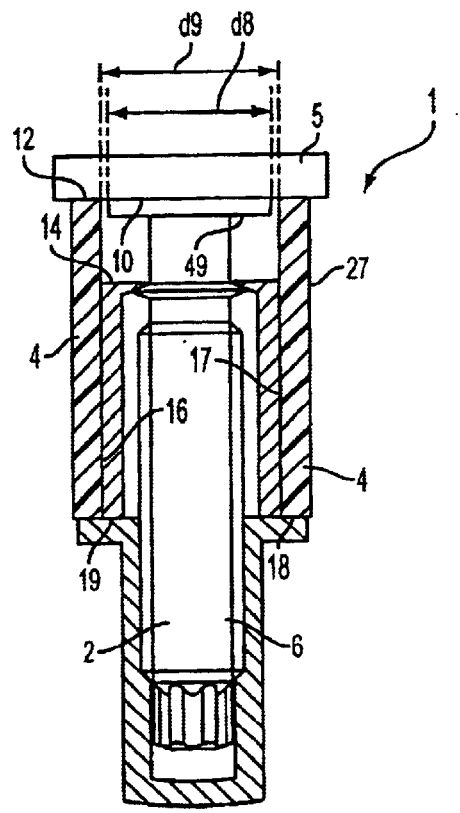

With the fastening element 1 according to FIG. 1B, both end regions are conically tapered, meaning they have conical surfaces 58 on the inside as well as the outside. This type of embodiment also has a favorable effect in the sense of a controlled radial expansion of the elastomeric sleeve 4. The radially outward expanding conical surface 58 on the sleeve end, which is removed from the head, together with the insertion bevel 25 facilitates the insertion of the fastening element 1 into a bore 24.

With assemblies of the type as described in the above, an axial offset 54 (FIG. 5) can occur between a bore 24 in the assembly component 20 and a bore 33*b* in an understructure 32. However, an axial offset 54 of this type is compensated by making the bore 33 correspondingly larger and/or by positioning the fixing bolt 2 with radial play in the spacer sleeve 3. This radial play between fixing bolt 2 and spacer sleeve 3 is generally achieved by dimensioning the diameter d5 of the threaded section 6 and the inside diameter d10 of the spacer sleeve 3 in such a way that a radial play 55 is created between the aforementioned parts (see FIG. 1C). If the connection is in the form of an axially effective form-fitting connection between the fixing bolt 2 and the spacer sleeve 3, it must be ensured that a radial play also exists between the cooperating latching elements and the fixing bolt 2 and/or the spacer sleeve 3. For the case shown in the drawings, this means that a radial play 56 must exists between the ring-shaped projection 13 and the spacer sleeve 3 and a radial play 57 between the projections 15 on the spacer sleeve 3 and the fixing bolt 2.

Figure 9:
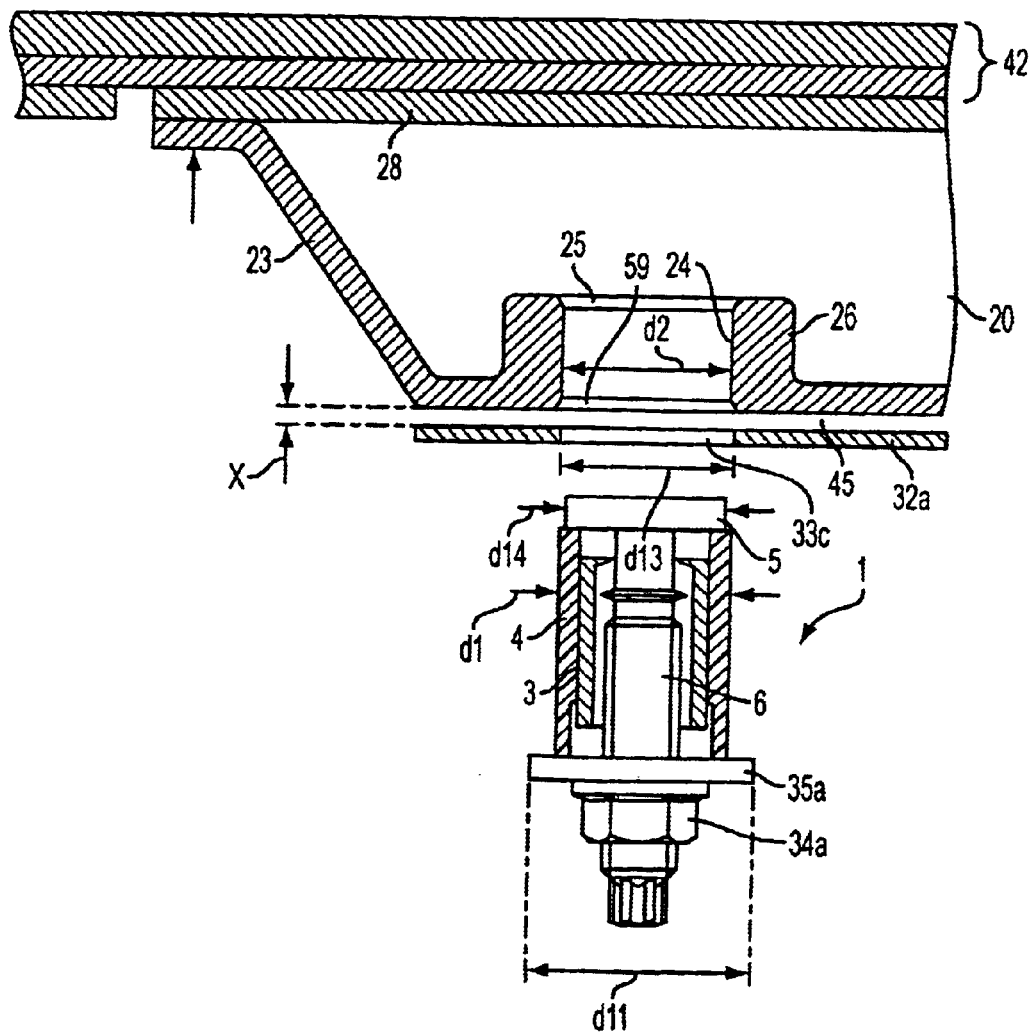
FIGS. 9 to 11 illustrate an attached assembly component, as shown in FIGS. 3 to 8, but with a differently designed fastening element.
Figure 10:
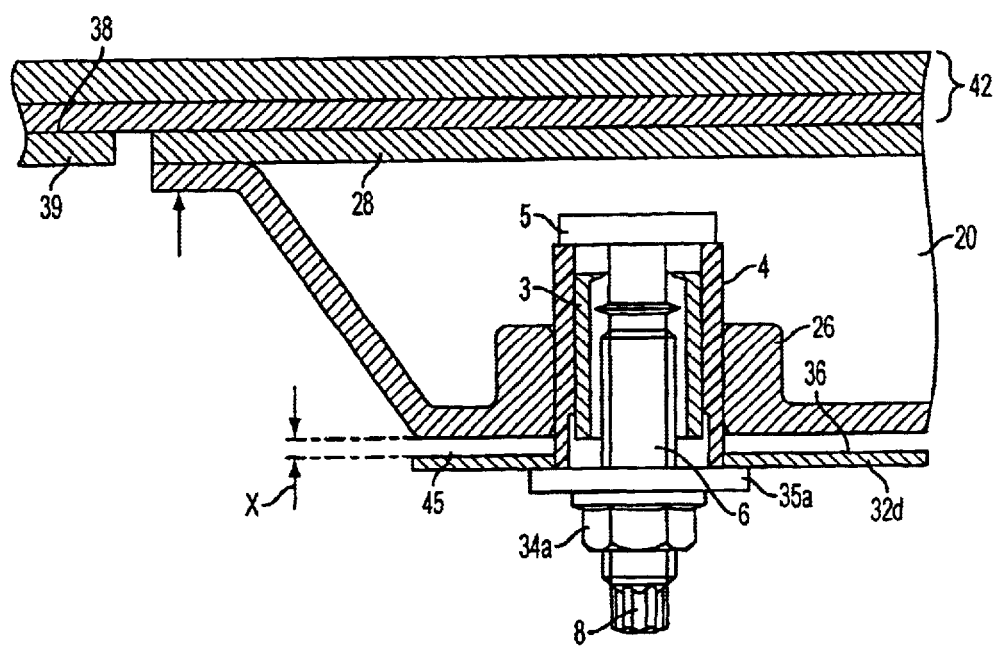
Figure 11:
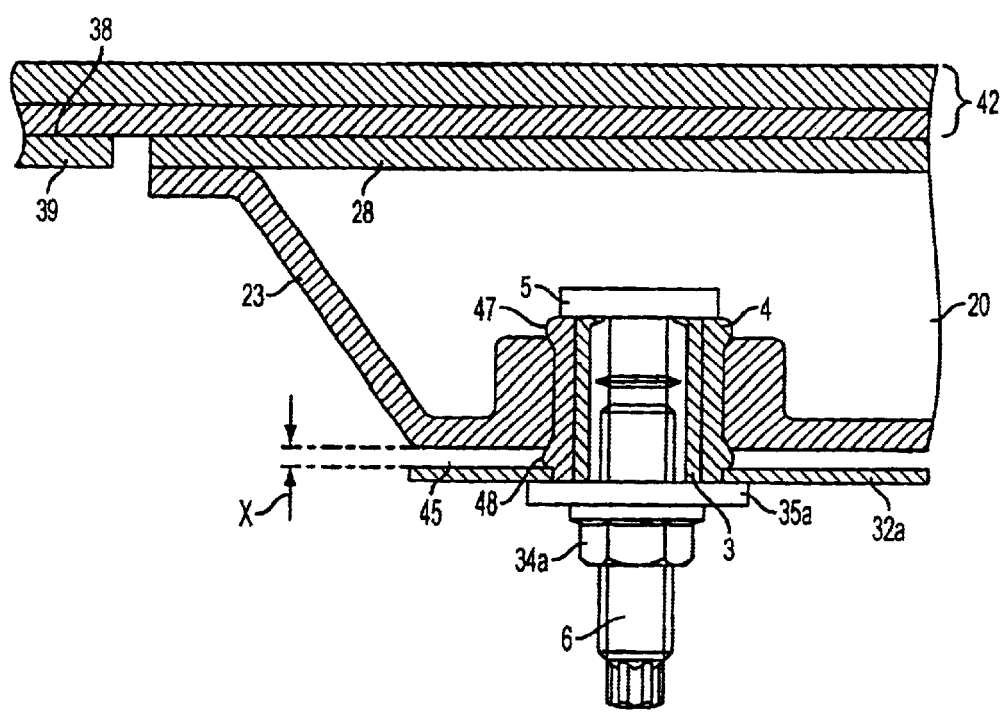
Figure 12:
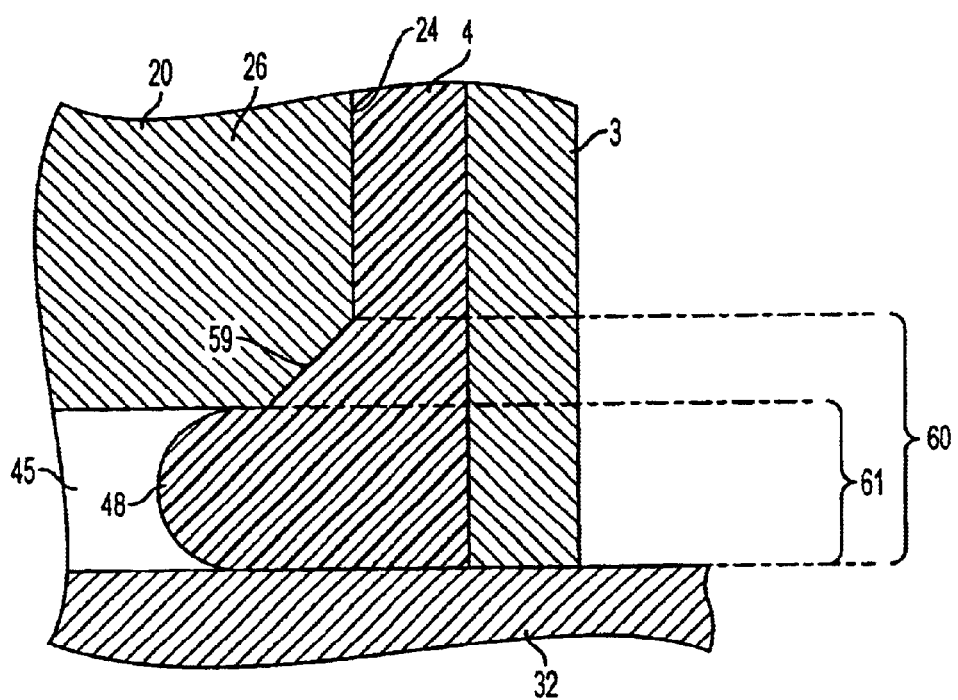
FIG. 12 is an enlarged view of the detail XII from FIG. 7.

The arrangement for joining parts, shown in FIGS. 9–11, is further simplified with respect to the assembly. A fastening element 1 is used in this case, which essentially differs from the above-described fastening elements in that the nut 34*a* is provided on the side facing the head with a flange 35*a* that is either formed onto the nut or is a separate part. This flange has a diameter d11 that is larger than the outside diameter d1 of the elastomeric sleeve 4. The diameter d14 of the head 5 in turn is of the same size or slightly smaller than d1. Finally, the head diameter d14 is slightly smaller than the inside diameter d2 of the bore 24 in the assembly component 20. The understructure 32 is provided with a bore 33*c*, which is dimensioned such that the fastening element 1 fits through it. That is the case if the bore 33*c* has a diameter d13, which corresponds approximately to the diameter d2 of the bore 24. The outside diameter d1 of the elastomeric sleeve 4 finally is dimensioned such that the fastening element 1 is positioned inside the bore 24 in such a way that it can be moved in the axial direction, if necessary with a slight frictional engagement.

Figure 1E:
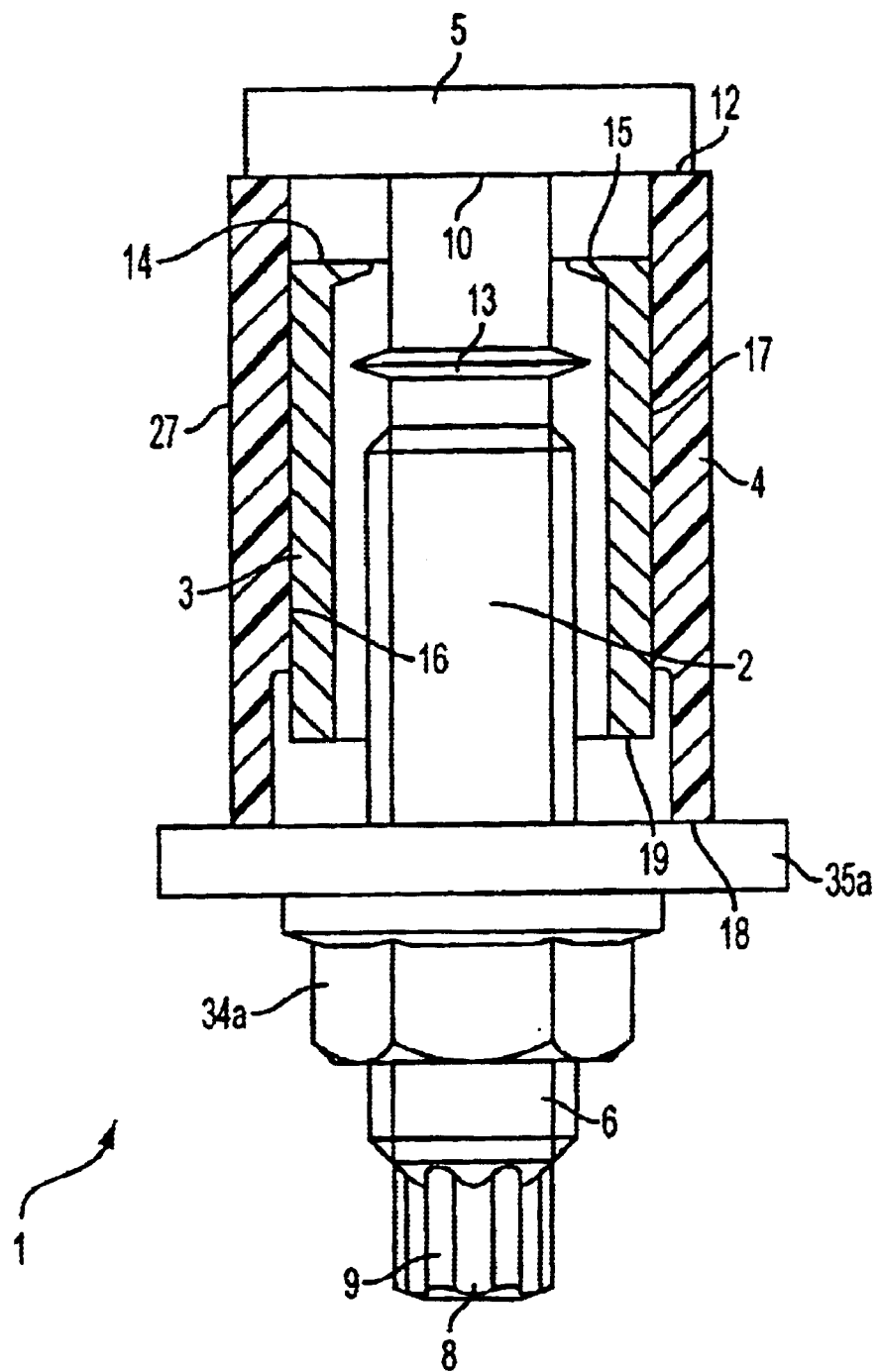

A fastening element 1 can also be used advantageously for the assembly of an assembly component that is accessible from one side only. In contrast to the above-described fastening elements, the fastening element 1 in this case can be completely pre-assembled (FIG. 1E). When attaching an assembly component 20 to an understructure 32*a*, this part is initially pre-secured with an auxiliary structure 42, as described above. Following this, the fastening element 1 is pushed through both bores 33*c* and 24, which are aligned coaxially (FIGS. 9 and 10), and the nut 34*a* is then tightened.

The elastomeric sleeve 4 is subsequently compressed in the axial direction, thereby forming material bulges 47, 48. In contrast to the above-described exemplary embodiments, the spacer sleeve 3 does not support itself on the understructure 32, but on the flange 35*a* of nut 34*a*, thus also resulting in a hard tightening case.

In addition to the insertion bevel 25, the bore 24 in the assembly component 20 also has an approximately complementary beveled surface 59 on the other side. Both beveled surfaces 25, 59 increase the bearing cross section 60 of the material bulge 47 and 48 that is formed by the elastomeric sleeve 4 and is effective in the axial direction. Without beveled surfaces, only a reduced cross section 61 would result.

Figure 13:
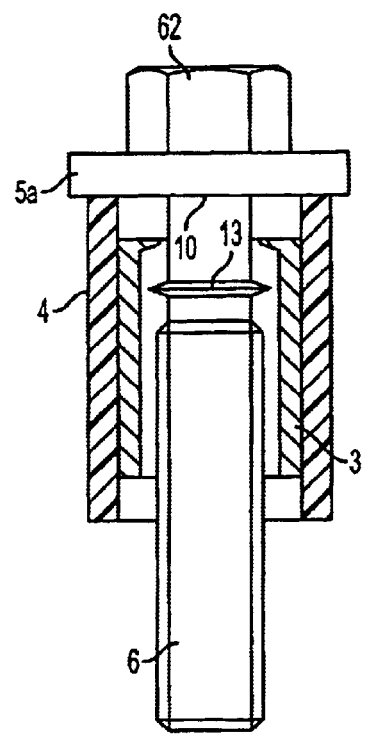
FIG. 13 shows a fastening element, for which the fixing bolt is provided with a head with an operating extension.
Figure 14:
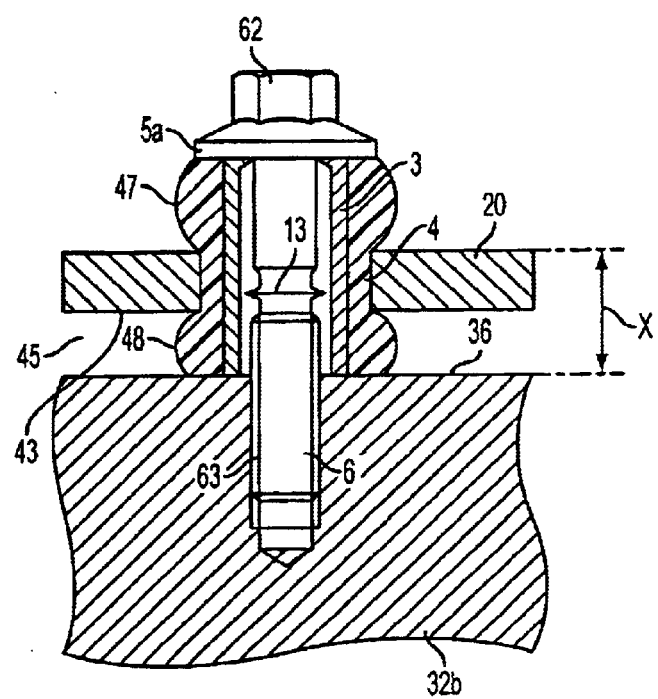
FIG. 14 shows an arrangement with a fastening element according to FIG. 13 in the assembled state.

FIG. 13 shows a fastening element where the head 5*a* is provided with an operating extension 62 with a hexagonal design to which a respective tool can be attached. An embodiment of this type is useful, for example, if an understructure 32*b* itself functions as a counter element and/or as a nut, as shown in FIG. 14, meaning it has a bore 63 with internal threads into which the threaded section 6 can be screwed.

Figure 15:
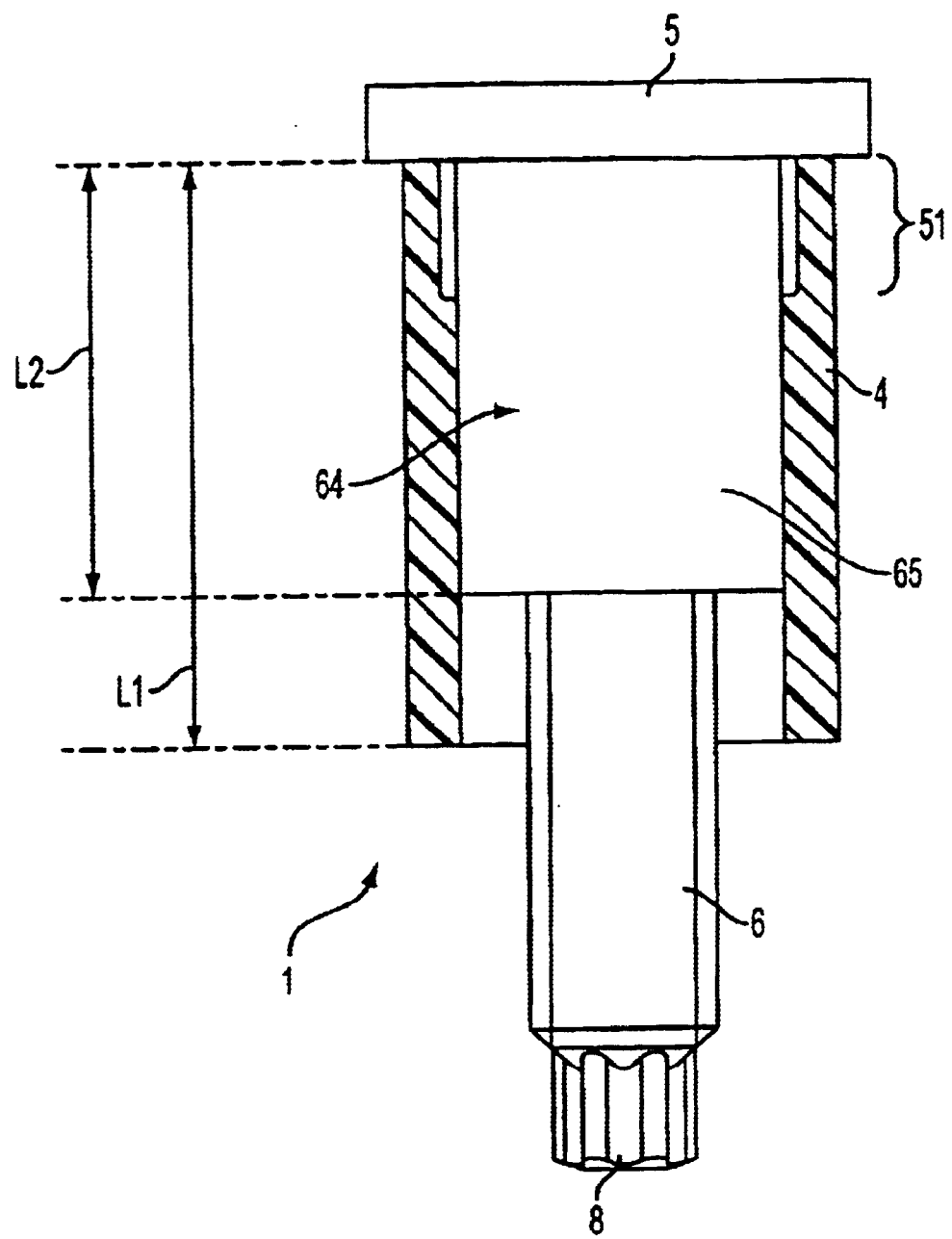
FIG. 15 illustrates a fastening element with cylinder-shaped spacer element formed onto the fixing bolt, according to another embodiment of the invention.
Figure 16:
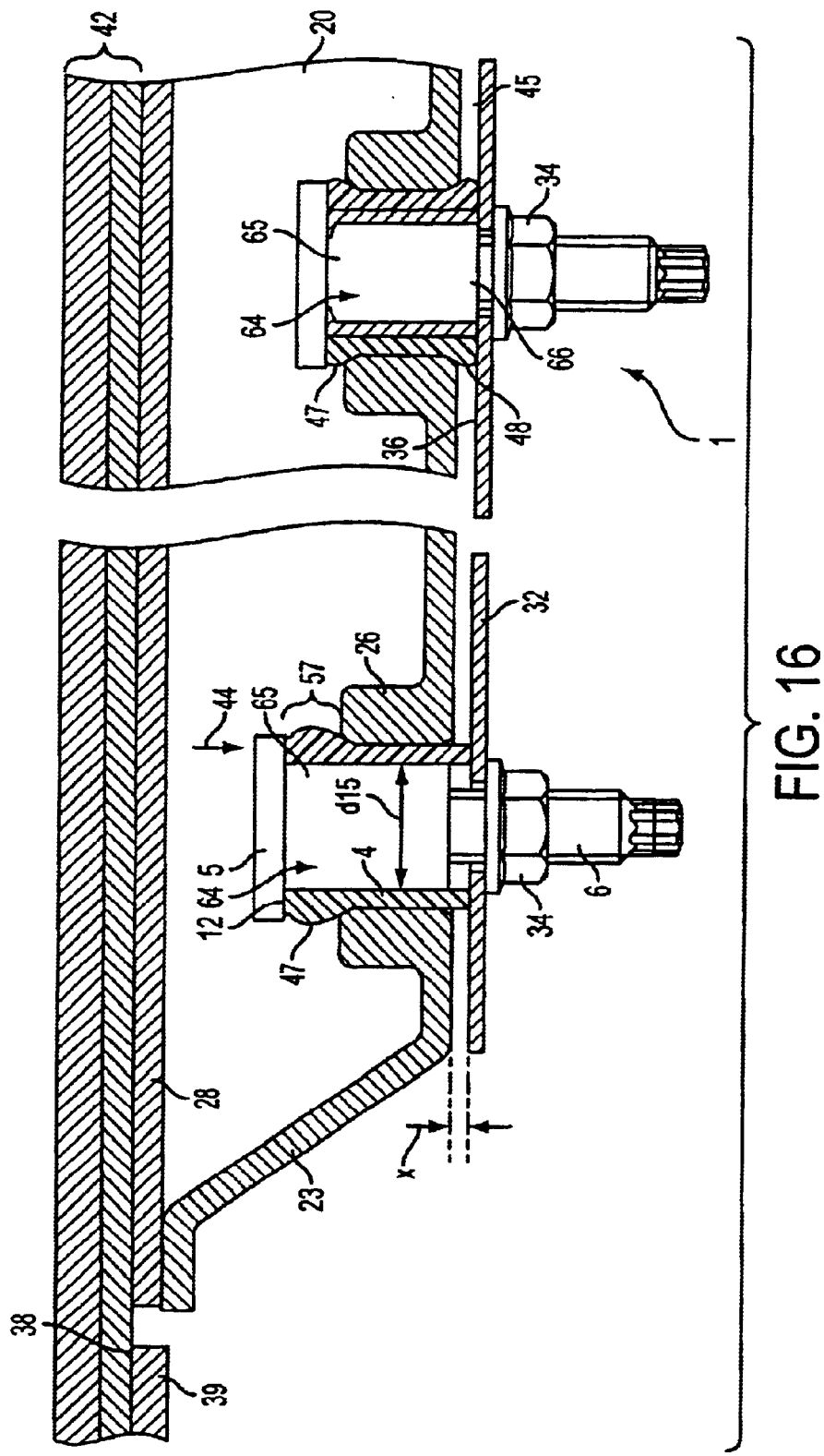
FIG. 16 shows an illustration showing an assembly component secured to an understructure with the aid of a fastening element according to FIG. 15.

The spacer element for the exemplary embodiment shown in FIGS. 15 and 16 is a cylindrical longitudinal section that forms one piece with the fixing bolt 2 and is henceforth called spacing cylinder 64. The spacing cylinder 64 has a uniform diameter d15 across its complete length L2 and extends up to the head support surface 10. The elastomeric sleeve 4 fits against the outside surface 65 of the spacing cylinder 64, but can be displaced in the axial direction relative to this cylinder. As for the exemplary embodiments described in the above, the head 5 projects in radial direction over the front end 12 of the elastomeric sleeve 4.

The function of the fastening element 1 shown in FIG. 15 essentially corresponds to that of the fastening elements described in the above. Starting with a pre-assembly state, approximately corresponding to FIG. 5, the fastening element 1 is shown in the state according to FIG. 15 which can be compared to that of a fastening element according to FIG. 1 where the spacer sleeve 3 is in the extreme position PI. That is to say, the spacer sleeve is pushed upward far enough so that it touches the head support surface 10. During the operation of tightening the nut 34, the end region 51 near the head of the elastomeric sleeve 4 is initially deformed radially toward the outside. This is helped by the fact that the wall thickness of the end region is reduced from the inside. During the tightening of nut 34, the spacing cylinder 64 moves downward relative to the elastomeric sleeve 4, meaning in the direction of arrow 44. A relative axial mobility is useful in this case as well between the spacer element, meaning the spacing cylinder 64, and the elastomeric sleeve 4. In the completely assembled state, shown on the right in FIG. 16, the spacing cylinder 64 rests with its lower front end 66 on the inside surface 36 of the understructure 32. In that case, a complete material bulge 47 has formed next to the head and a complete material bulge 48 has formed at a distance to the head.

The invention has been described in detail with respect to exemplary embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. An arrangement for attaching an assembly component with variable spacing to an understructure, said arrangement comprising:

an assembly component having at least one bore for receiving a fastening element, and a material region of a height surrounding at least one bore; and a fastening element including a fixing bolt having a length and two ends, a spacer element having a diameter that is larger than a diameter of the fixing bolt so as to surround at least a portion of said fixing bolt and a length with a cylindrical outside surface, and an elastomeric sleeve having a length and the fixing bolt having a radially overhanging head with a larger outside diameter than the spacer element on one end and, on the other end, a fixing section that is adapted to interact with a counter element;

wherein the elastomeric sleeve surrounds the spacer element and the length of the elastomeric sleeve is longer than the spacer element, the elastomeric sleeve being positioned inside a bore of the assembly component so that the elastomeric sleeve is axially displaceable relative to the bore in the assembly component, as well as relative to the spacer element;

wherein the respective length of the elastomeric sleeve and the spacer element is longer than the height of the material region of the assembly component and the length of the fixing bolt is dimensioned such that the fixing section projects from the elastomeric sleeve; and, wherein an external surface of the elastomeric sleeve includes a generally cylindrical portion having a length longer than the bore of the assembly component so as to allow for axial positioning of the fastening element relative to the assembly component and the elastomeric sleeve being expandable to fixedly hold said relative axial position.

2. The arrangement according to claim 1, wherein the spacer element is designed as a spacer sleeve through which the fixing bolt extends.

3. The arrangement according to claim 2, wherein the spacer sleeve is held in a form-fitting manner on the fixing bolt.

4. The arrangement according to claim 3, wherein the fixing bolt has a radial ring-shaped projection that extends over the circumferential surface of the fixing bolt and the spacer sleeve has several projections, distributed over the circumference of the spacer sleeve, provided on the end of the spacer sleeve, near the head, where the projections of the spacer sleeve radially extend over the radial ring-shaped projection of the fixing bolt.

5. The arrangement according to claim 4, wherein the distance between the radial ring-shaped projection and the head is dimensioned such that the fixing bolt can move axially inside the spacer sleeve.

6. The arrangement according to claim 2, wherein the fixing bolt is positioned with radial play inside the spacer sleeve.

7. The arrangement according to claim 1, wherein the spacer element is a spacing cylinder that is formed onto the fixing bolt.

8. The arrangement according to claim 1, wherein the inside surface of the at least one bore and at least a central longitudinal section of the outside surface of the elastomeric sleeve are embodied as cylindrical shell surfaces.

9. The arrangement according to claim 1, wherein an end region of the elastomeric sleeve, which extends on either side of the bore of the assembly component, has a higher malleability than remaining regions of the elastomeric sleeve.

10. The arrangement according to claim 9, wherein the end region has a reduced wall thickness.

11. The arrangement according to claim 1, wherein the elastomeric sleeve is held in a friction-fit manner with the spacer element.

12. The arrangement according to claim 11, wherein the spacer element is positioned in such a way inside the elastomeric sleeve as to form an axially effective form-fitting connection that can be severed repeatedly if an axial force is administered.

13. The arrangement according to claim 11, further comprising a protective cap that is secured in axial direction on the fixing section of the fixing bolt, said protective cap having an outside diameter, which exceeds the inside diameter of the elastomeric sleeve.

14. The arrangement according to claim 1, wherein at least one of the inside and the outside surface of the elastomeric sleeve is provided with a coating to improve sliding between the elastomeric sleeve and the spacer element.

15. A fastening element for attaching an assembly component with variable spacing to an understructure, said fastening element comprising:

a fixing bolt having a head at one end, a fixing section at an end opposite the one end that is adapted to interact with a counter element, and a threaded section between the one end and the opposite end;

a spacer element having a diameter that is larger than a diameter of the fixing bolt and a length, said spacer element surrounding the fixing bolt and having an outside surface, where the head of the fixing bolt is larger in diameter than the diameter of the spacer element; and an elastomeric sleeve having a length longer than the length of the spacer element, said elastomeric sleeve surrounding the outside surface of the spacer element and being axially displaceable relative to the spacer element, wherein the fixing bolt has a length so that the fixing section projects from the elastomeric sleeve, the combination of the elastomeric sleeve, spacer element and fixing bolt is adapted to be inserted into a bore of an assembly component that has a material region of a height surrounding the bore of the assembly component, and the respective length of the elastomeric sleeve and the spacer element is longer that the height of the material region of the assembly component and wherein an external surface of the elastomeric sleeve includes a generally cylindrical portion having a length longer than the bore of the assembly component so as to allow for axial positioning of the fastening element relative to the assembly component and the elastomeric sleeve being expandable to fixedly hold said relative axial position.

16. The fastening element according to claim 15, further comprising a threaded part, which interacts with threaded section of the fixing bolt wherein after the combination of the elastomeric sleeve, spacer element and fixing bolt is inserted into a bore of an assembly component and a bore of an understructure that is to be attached to an assembly component with a gap, the threaded part is tightened against the understructure causing the head of the fixing bolt to push down on the elastomeric sleeve thereby shortening the elastomeric sleeve and pushing elastomeric material into the gap and between the head of the fixing bolt and a top of the material region surrounding the bore of the assembly component so that a radially projecting bulge of elastomeric material is formed on either side of the material region surrounding the bore of the assembly component.

17. The fastening element according to claim 16, wherein the elastomeric sleeve tightly secures the assembly component to the understructure with vibration damping and seals the bore of the assembly component.

18. The fastening element according to claim 16, wherein the fixing bolt has a radial ring-shaped projection that extends over the circumferential surface of the fixing bolt and the spacer sleeve has several projections, distributed over the circumference of the spacer sleeve, provided on the end of the spacer sleeve, near the head, where the projections of the spacer sleeve radially extend over the radial ring-shaped projection of the fixing bolt.

19. The fastening element according to claim 16, wherein an end region of the elastomeric sleeve, which extends on either side of the bore of the assembly component, has a higher malleability than remaining regions of the elastomeric sleeve.

20. The arrangement according to claim 19, wherein the end region has a reduced wall thickness.

21. An arrangement for attaching an assembly component with variable spacing to an understructure, said arrangement comprising:

an assembly component having at least one bore for receiving a fastening element, and a material region of a height surrounding at least one bore;

an understructure having at least one bore for receiving a fastening element and being spaced from the assembly component to form a gap; and a fastening element including a fixing bolt having a length and two ends, a spacer element having a diameter that is larger than a diameter of the fixing bolt so as to surround at least a portion of said fixing bolt and a length with a cylindrical outside surface, and an elastomeric sleeve having a length and the fixing bolt having a radially overhanging head with a larger outside diameter than the spacer element on one end and, on the other end, a fixing section that is adapted to interact with the understructure;

wherein the elastomeric sleeve surrounds the spacer element and is longer than the spacer element, the elastomeric sleeve being positioned inside a bore of the assembly component so that the elastomeric sleeve is axially displaceable relative to the bore in the assembly component, as well as relative to the spacer element;

wherein an external surface of the elastomeric sleeve includes a generally cylindrical portion having a length longer than the bore of the assembly component so as to allow for axial positioning of the fastening element relative to the assembly component and the elastomeric sleeve being expandable to fixedly hold said relative axial position;

wherein the respective length of the elastomeric sleeve and the spacer element is longer than the height of the material region of the assembly component and the length of the fixing bolt is dimensioned so that the fixing section projects from the elastomeric sleeve and, in the fully assembled state, the fixing section projects into a bore of the understructure;

wherein in the fully assembled state, the spacer element is braced between the radially overhanging head of the fixing bolt and the understructure is held by the fixing section of the fixing bolt; and wherein in the fully assembled state, the elastomeric sleeve is axially compressed so that it respectively forms a material bulge in the gap and between the head of the fixing bolt and the top of the material region of the assembly component.

* * * * *